May 20, 1952 H. W. HARRISON ET AL 2,597,482
JOINT
Filed Feb. 23, 1946 3 Sheets-Sheet 1

H.W. HARRISON
ROSS BASSINGER
INVENTORS.
BY Lester B. Clark
Ray L. Smith
ATTORNEYS May 20, 1952  H. W. HARRISON ET AL  2,597,482
JOINT
Filed Feb. 23, 1946  3 Sheets-Sheet 3
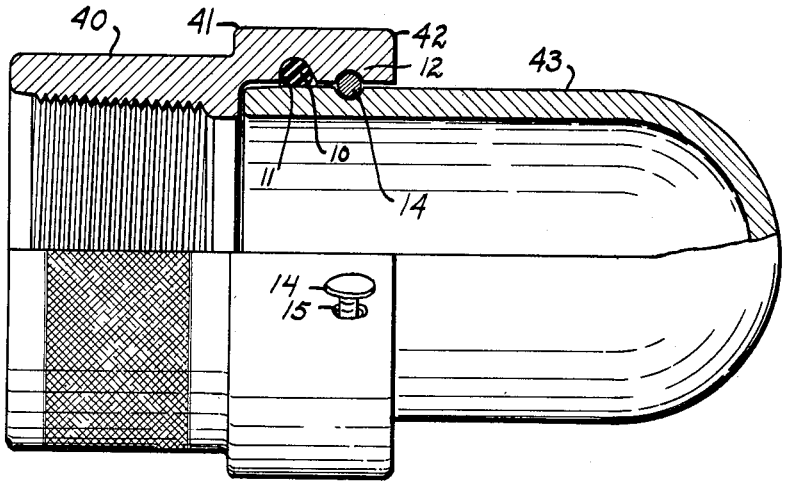
Fig 6
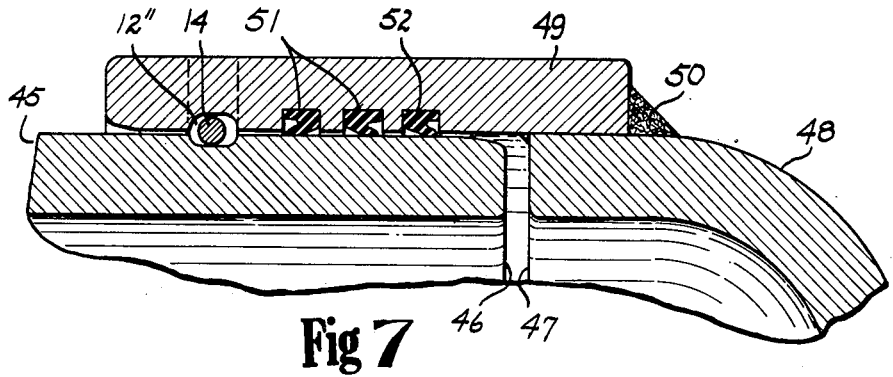
Fig 7
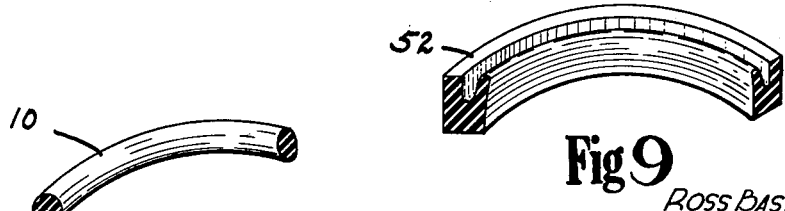
Fig 8
Fig 9
ROSS BASSINGER
H.W. HARRISON
INVENTORS.
BY Lester B Clark
&
Ray L. Smith
ATTORNEYS Patented May 20, 1952

2,597,482

UNITED STATES PATENT OFFICE 2,597,482

JOINT

Harry W. Harrison and Ross Bassinger, Houston, Tex.

Application February 23, 1946, Serial No. 649,680

2 Claims. (Cl. 285—97.3)

This invention relates to a joint, and in particular to a joint between elongated members capable of being readily connected or disconnected and, in one form, having its component parts so constructed and arranged that it is resistant to leakage from internal or external pressure.

The primary object of the invention is to provide a joint that is simple and inexpensive, and one which may be quickly made up or disconnected.

Another object is to provide a joint that may be made up or disconnected without requiring any special tools therefor.

A further object is to provide a joint which comprises interfitting parts arranged to removably receive a locking member, and having cooperating sealing means that becomes effective instantly upon interfitting of the parts.

The invention also comprehends, in one form, a structure in which an ordinary nail or equivalent may be utilized to effect an interlock of the parts, such nail being easily insertable or withdrawable by means of an ordinary hammer.

A still further object is to provide a joint that is of particular utility in releasably securing the head on a pressure vessel.

It is also an object to provide a joint for the interconnection of relatively thin walled tubular members, the lock member of the joint being relied upon to wedgingly engage and sufficiently deform such members that a joint of adequate strength is to be provided.

The foregoing are primary objects which, together with other objects and advantages of the invention will be more fully apparent from the following description considered in connection with the accompanying drawings in which—

Fig. 6 is a quarter section elevational view showing the use of the invention in providing a closure for a tabular member.

Fig. 7 is a partial sectional view showing the use of the invention in removably securing in place the closure head of a pressure vessel;

Figs. 8 and 9 are partial views of forms of the seal ring which constitutes an element of the invention when a sealed joint is provided;

Figure 1:
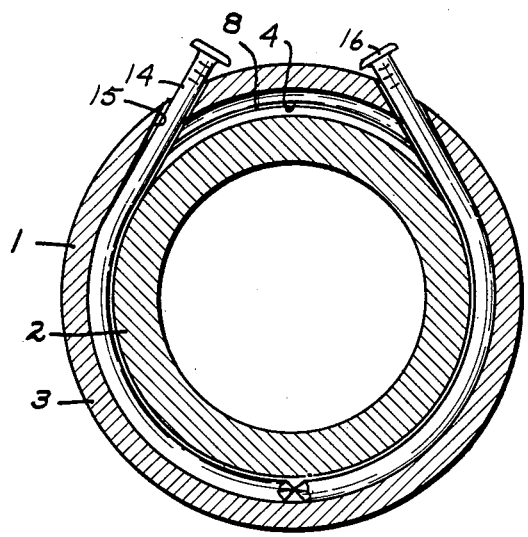
Fig. 1 is a transverse sectional view through a joint embodying the invention and showing the manner of using ordinary nails, or equivalent, in making up the joint, the view being taken on line 1—1 in Fig. 2.
Figure 2:
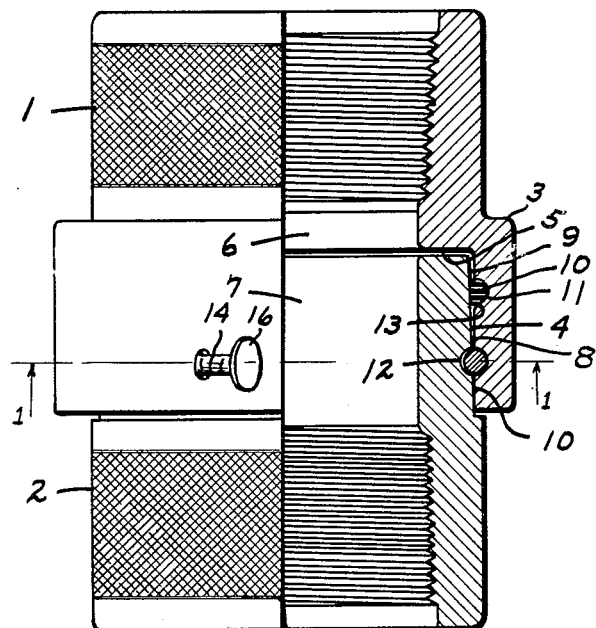
Fig. 2 is an elevational view of the joint of Fig. 1, same being shown in quarter section.

A joint embodying the invention, as shown in Figs. 1 and 2, comprises tubular members 1 and 2 to be releasably interconnected. The end of the member 1 is enlarged at 3 and has a counterbore 4 thereby providing an outwardly facing shoulder 5 at its bottom.

The bore 6 in the member 1 is coaxial with and preferably of the same diameter as the bore 7 in the member 2. This member is reduced peripherally at 8 thus providing a spigot end which slidingly fits within the counterbore 4. The spigot end 8 is slightly tapered at its extreme end 9 to enter the toroidal seal ring 10 seated within groove 11 in the inner periphery of the counterbore 4. The seal ring 10 is slightly compressed, as indicated, to form a seal as the spigot is moved into the end thereof and into juxtaposed position with the shoulder 5 on the member 1.

Outwardly from the groove 11 there are provided opposed grooves in the members 1 and 2 which form an annular passage 12 to receive the lock member or members 14 which enter complemental opening 15. As indicated the member 14 may comprise a common nail, it being understood that the opening 15 and the passage 12 will be of such diameter as to receive the desired size of nail or other rod-like lock member. One or more nails may be used, the illustrated embodiment showing one manner of using two nails for interconnecting the component parts of the joint.

In explaining the manner of connecting up or disconnecting the joint thus far described, it is here noted that the members 1 and 2 may be threaded for attachment to longer elements to be interconnected. If the joint is to be a sealed joint between tubular members, a toroidal seal ring 10 is placed in the groove 11 and the spigot end 8 is then inserted into the counterbore 4 until the grooves forming the passage 12 are in mating relation. During such insertion the periphery of the spigot engages and slightly deforms the seal ring 10, if used, whereby an effective seal results.

The nail or nails 14 are next inserted into the openings 15 and are forced, as may be necessary, to the relative positions shown in Fig. 1. If the joint is of considerable diameter, as will be more specifically referred to hereinafter, the lock member 14 may be inserted with little application of force since under such circumstances no fibers of the lock member will be stressed beyond the elastic limit as the member moves along the passage 12. If, however, the diameter of the joint is relatively small, impacts from an ordinary hammer may be utilized to force the lock member into place. While the nails 14 in such case take a permanent set, it is to be understood that they are readily withdrawable.

Preferably the groove 11 is slightly tapered at 13 on its outer wall so that pressure within the bores 6 and 7 will cause the seal ring 10 to distort wedgingly between this taper and the surface of the spigot end 8 whereby an effective seal against high pressure is provided. At the same time the lock member 14 in the groove 12 is subjected to shear on its diameter and hence such member or members are capable of adequate resistance against the tendency for the members 1 and 2 to separate either from pressure therein or from tension thereon.

It is apparent from the foregoing that the joint may be made up without the use of tools in some cases, or in any event a simple tool such as a hammer may be used either for making up or disconnecting the joint.

Figure 3:
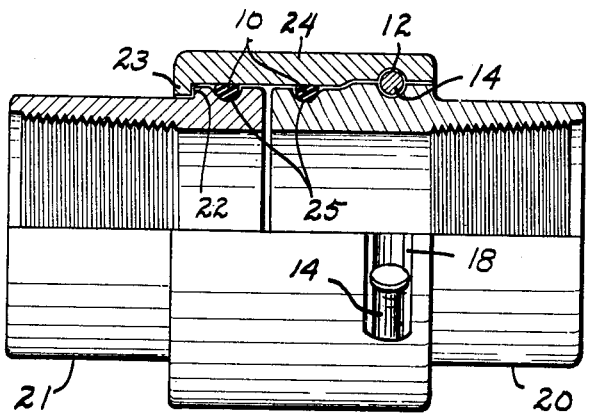
Fig. 3 is an elevational view in quarter section showing a modified form of the joint using a separate coupling member.

In the embodiment of the invention as shown in Fig. 3 the members to be interconnected are shown at 20 and 21 in abutting end to end relation, the latter having an outwardly facing shoulder 22 for abutment with the inwardly extending flange 23 on the end of the collar or sleeve 24 which surrounds the abutting ends. Proximate the end of each of the members is a peripheral groove 25 which receives seal ring 10 and, as already indicated, each of these rings is of such cross sectional dimension that slight deformation thereof is produced as the collar is moved telescopically thereover and the flange 23 engages the shoulder 22. Outwardly from the groove 25 in the member 20 are opposed grooves in the elements 20 and 24 forming the passage 12 which receives the lock member 14 which is inserted in the manner already indicated.

Figure 10:
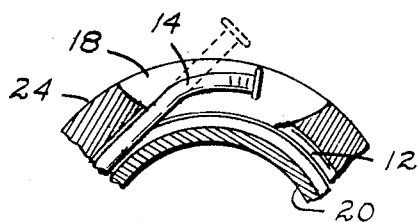
Fig. 10 is a detail showing the manner of displacing the end of the lock member in the joint so that such end will not protrude beyond the periphery of the joint.

In order that the end of the lock member 14 will not protrude beyond the periphery of the collar 24, a slot 18 may be provided in lieu of the opening 15. The end of the lock member 14 may then be bent over as clearly shown in Fig. 10 so that such end will lie entirely within the periphery of the collar 24. It is to be understood that if two lock members 14 are used, a separate slot will be provided for each or, if desired, a single slot may serve this purpose.

Figure 4:
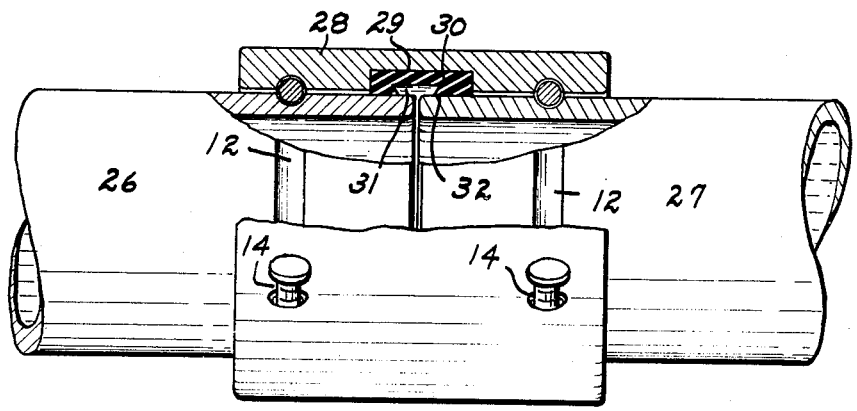
Fig. 4 is a view similar to that of Fig. 3, but showing the use of two lock members and a lipped seal ring in completing the joint.

In Fig. 4 the ends of the members 26 and 27 to be interconnected are plain except for the provision of peripheral grooves which cooperate with complementary grooves in the sleeves 28 to form annular passages 12 into which the lock members 14 are inserted so that relative axial movement of the parts is prevented.

Figure 5:
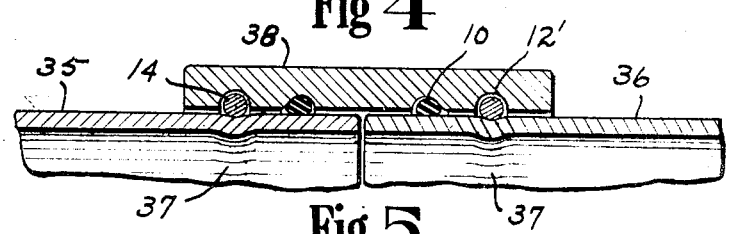
Fig. 5 is a detail similar to that of Fig. 4, but showing the invention as used in interconnecting the ends of two thin walled pipe sections.

In order to prevent leakage through this joint there is provided a central internal groove 29 in the sleeve 28. This groove receives the packing ring 30 having an internal groove 31 with tapering end walls which form lips 32 whereby internal fluid pressure will press these lips into engagement with the periphery of the underlying pipe ends. In Fig. 5 the tubular members 35 and 36 are relatively thin walled, and therefore a preformed groove is provided only in the sleeve 38. When the lock members 14 are forced into place, the walls of the tubular members are deformed as indicated at 37 and in this manner there are provided the desired passages 12' within which the lock members wedgingly engage the respective pipe ends. In this form of the invention the toroidal seal rings 10 may be used in the stead of the seal ring 30 shown in Fig. 4.

It seems apparent that, as above pointed out, the invention is likewise adaptable to form a closure for pipe ends, pressure vessels and the like. This adaptation is shown in Figs. 6 and 7 of the drawings. The member 40 in Fig. 6 is enlarged at 41 to form a bell end 42 to receive the inner end of the bull plug 43. Seal ring 11 is positioned in the groove 10 on the interior of the bell. Outwardly therefrom are complementary grooves forming the annular passage 12 for the lock member 14.

When the joint of the invention is utilized for securing a closure head upon a pressure vessel of considerable diameter, the structure shown in Fig. 7 is preferred. The vessel body 45 has its end 46 opposed to the end surface 47 of the head 48. The annulus 49 may be an integral part of the head 48 or, as illustrated, may comprise a separate member secured to the head as by means of the fillet of weld metal shown at 50.

Inasmuch as the pressure vessel embodying the joint is of considerable diameter, the passage 12'', receiving the lock member 14, is preferably slightly wider than the lock member. It is therefore unnecessary that the body 45 and the head 48 be moved to exacting relative positions for insertion of the member. In fact it has been found that in such a structure the lock member can readily be inserted into or withdrawn from the passage 12'' by hand and that component parts of the joint will move to alignment and interlocked positions as soon as internal pressure or vacuum is applied to the vessel.

The annulus 49 extends outwardly from the head 48 and overlies the end of the body 45. Grooves 51 on the interior of this annulus receive lipped rings 52 having a cross sectional configuration best seen in Fig. 9. These rings are suitably designed to have the lips thereof face in the desired direction or directions so that they seal against leakage into or from within the pressure vessel depending upon whether the vessel is used with a subatmospheric or superatmospheric pressure on its interior.

Broadly the invention comprehends a joint which is capable of being readily made up or disconnected by the aid of simple tools or even manually.

The invention claimed is:

1. A joint comprising a member having an enlarged end portion and an outwardly facing shoulder thereon, a sleeve slidable over said enlarged end to extend therebeyond and having a flange engageable with said shoulder, a second member entering the outwardly extending portion of said sleeve and having its end in abutting relation with the end of the first mentioned member, opposed grooves in said sleeve and said second member forming an annular passage therebetween, and a lock member filling said passage whereby the sleeve and members are mutually restrained from relative axial movement.

2. A joint comprising a tubular member having an enlarged end portion and an outwardly facing shoulder thereon, a sleeve slidable over said enlarged end to extend therebeyond and having a flange engageable with said shoulder, a second tubular member entering the outwardly extending portion of said sleeve and having its end in abutting relation with the end of the first mentioned tubular member, opposed grooves in said sleeve and said second tubular member forming an annular passage therebetween, a lock member filling said passage whereby the sleeve and members are mutually restrained from relative axial movement, an additional groove in each of the members proximate the ends thereof, and annular seal rings in said additional grooves in pressure engagement with the sleeve whereby a seal is formed at opposite sides of the abutting tubular ends.

HARRY W. HARRISON.
ROSS BASSINGER.

REFERENCES CITED

The following references are of record in the file of this patent:

UNITED STATES PATENTS

| Number | Name | Date |
| --- | --- | --- |
| 1,329,760 | Fulton | Feb. 3, 1920 |
| 2,013,660 | Lauer | Sept. 10, 1935 |
| 2,389,825 | Smith | Nov. 27, 1945 |